United States Patent

Rolle

[15] 3,653,934

[45] Apr. 4, 1972

[54] COMPOSITION FOR MAKING GASTRO-RESISTANT GELATIN CAPSULES

[72] Inventor: Fernand Jacques Rolle, Beinheim, France

[73] Assignee: R. P. Scherr Corporation

[22] Filed: Dec. 23, 1969

[21] Appl. No.: 887,787

[30] Foreign Application Priority Data

Dec. 27, 1968 France..................................181144

[52] U.S. Cl..............................106/125, 106/126, 424/37, 424/360
[51] Int. Cl. .........................................................C09d 3/04
[58] Field of Search..........................................106/125, 126

[56] References Cited

UNITED STATES PATENTS 3,489,567  1/1970  McGraw..............................106/125
2,899,327  8/1959  Christopher.........................106/136

Primary Examiner—Theodore Morris
Attorney—Karl W. Flocks

[57] ABSTRACT

The invention provides a new gelatine composition suitable for producing capsules having better resistance to enzymes, better mechanical strength, improved resistance to moisture and a longer storage life than known capsules. This composition essentially comprises the combination product of gelatine, water, glycerine and/or sorbitol and a silicone fluid having an intrinsic viscosity of from 100 to 12,500.

2 Claims, No Drawings

COMPOSITION FOR MAKING GASTRO-RESISTANT GELATIN CAPSULES

The present invention relates to improved gelatine capsules.

The pharmaceutical industry currently uses capsules and gelloids made of gelatine. Whatever their composition may be, these gelloids and capsules do not always have a high resistance to enzymes, good mechanical strength, and a high resistance to moisture; and their storage life is frequently limited. In addition, gelatine capsules and gelloids which are resistant to gastric fluids, and are produced by subjecting them to a particular treatment which will be referred to later, have a certain number of drawbacks.

Thus, for example, it is desirable to have available resistant gelatine capsules which are entero-soluble, in order that certain active constituents which have a bad smell or a bad taste, or are very volatile, are not liberated or do not function until they have passed the stomach. Gastro-resistant capsules are also advantageous either for the administration of active substances which are unstable in the acid medium of the stomach or for the administration of delayed action preparations, or for the administration of preparations which may have an irritant action on the mucous membranes of the stomach.

It is already known to prepare gastro-resistant gelatine capsules by treating the gelatine envelope with rapid-action aldehydes, oxy-aldehydes, di-ketones or oxy-ketones, and especially with formaldehydes.

Nevertheless, the known methods for the manufacture of gastro-resistant gelatine capsules had the disadvantage of requiring a long storage-period of the capsules, (of the order or several weeks), before the optimum effect was obtained, since the action of the treating agent is slow and gradual, and stability is only reached after a considerable time.

Furthermore, with known capsule compositions, it is relatively difficult to make sure that the fixed quantity of the treating agent is the same from one batch of capsules to another, or even from one capsule to another.

A main object of the present invention is to provide a new gelatine composition suitable for producing capsules having a better resistance to enzymes, better mechanical strength, improved resistance to moisture and a longer storage life than known capsules.

Another object of the invention is to provide gelatine capsules capable of being readily converted to gastro-resistant capsules which have properties and characteristics superior to those of known gastro-resistant capsules.

A further object of the invention is to provide gelatine capsules which are particularly suitable for treatment with aldehydes, and especially with formaldehyde, in order to impart improved gastro-resistant properties.

According to the invention, there is provided a composition for the manufacture of gastro-resistant capsules and gelloids of gelatine, comprising the combination of gelatine, water, glycerine and/or sorbitol, and a silicone fluid having an intrinsic viscosity between 100 and 12,500.

The invention also provides improved gelatin capsules produced from the above defined composition and rendered gastro-resistant by treatment with an aldehyde.

According to other feature of the invention, the basic composition of the capsules comprises, in the combined state, from 1 to 90 percent of silicone fluid with respect to the total weight of gelatine plus water plus glycerine and/or sorbitol.

The silicone fluid is advantageously selected from dimethyl-polysiloxanes and methyl-phenyl-polysiloxanes having an intrinsic viscosity between 100 and 12,500.

Capsules according to the invention are produced by mixing together water, gelatine, glycerine and/or sorbitol and silicone fluid in the following ranges of proportions:

| | |
|---|---|
| water | from 23% to 27% (by weight) |
| Glycerine and/or sorbitol | from 17% to 29.50% (by weight) |
| Gelatine | from 58% to 33.50% (by weight) |
| Silicone | from 1% to 90% (by weight) | with respect to the total weight of the water, glycerine and/or sorbitol and gelatine.

Gelloids according to the invention are obtained by mixing together water, gelatine and silicone in the following ranges of proportions:

| | |
|---|---|
| Gelatine | from 20% to 50% (by weight) |
| Glycerine and/or sorbitol | 0.5% (by weight) |
| Water | from 50% to 80% (by weight) |
| Silicone | from 1% to 50% (by weight) | with respect to the total weight of the gelatine, glycerine and/or sorbitol and water.

This operation is carried out in a conventional mixer which can be heated under vacuum, and the whole mass is heated up to complete melting. From this molten mass, the capsules are made in any manner known per se.

The aldehyde agent for the subsequent treatment of the capsules thus produced is preferably formaldehyde.

This treatment can be effected by immersion, by spraying, or preferably by sprinkling the capsules.

The aldehyde agent is advantageously dispersed in a very volatile, water-miscible solvent.

The volatile water-miscible solvent is advantageously acetone. 1:150.

The concentration of the aldehyde treatment solution preferably corresponds to a ratio of 30 percent formaldehyde solution to acetone of 1:50 to 1:150.

Other characteristic features and advantages of the invention will be brought out more clearly from the following description.

The present invention provides capsules having improved characteristics as compared with known types of gelatine capsules, in particular resistance to enzymes, mechanical strength, resistance to moisture and a long storage life. The invention provides also capsules having the above characteristics but also capable of being converted to gastro-resistant capsules having improved characteristics as compared with known capsules.

The Applicant has discovered that when gelatine, water, glycerine or sorbitol, or a combination of glycerine and sorbitol, and a silicone fluid with or without other conventional additives used in the composition of gelatine capsules (such as coloring agents and plastifying agents) are combined in the molten state, there is obtained a mass which, by fabrication by a conventional process, gives capsules having the characteristics referred to above. The Applicant has also discovered that when these capsules are subsequently treated (after storage or immediately after their manufacture) with formaldehyde in dispersion in a volatile water-miscible solvent, there are obtained gastro-resistant capsules which do not have the disadvantages of known gastro-resistant capsules and which exhibit entirely unexpected characteristics namely, that the optimum effect of gastro-resistance is obtained at the end of 4 days, and that the time of opening of a capsule in gastric juices is constant and independent of the storage time.

Tests carried out with artificial gastric juices have in fact shown that the gastro-resistance in vitro of capsules stored for a very long time and of capsules having been stored for only 96 hours is, constant at a minimum of 2 hours. The time of opening in the intestinal juices also remains remarkably constant, irrespective of the period of storage.

These facts are surprising and although at the present time no theoretical explanation has been found, it may be assumed that the silicones selectively block certain functions of the gelatine molecule, so that the possible subsequent reaction process with the formaldehyde is different from that which has been obtained hitherto, in the sense that the formaldehyde only reacts with the functional groups which are not blocked.

This being the case, in view of the particular behaviour of the basic gelatine capsules according to the invention, it thus becomes possible to regulate in a simple and accurate manner the gastro-resistance and the time of opening of the capsules in the intestinal juices, by regulating the large amount of formaldehyde used.

Tests carried out on the basic capsules according to the invention have proved that the thickness of the envelope of the capsules had no effect on the period of opening of the capsules treated with aldehyde. This has led to the discovery that in order to calculate the theoretical quantity of aldehyde necessary for the treatment it is no longer necessary, as in the prior art, to refer to the weight of the capsules but rather to their surface area independently of their geometric shape.

During the production of the gelatine mass for the preparation of capsules according to the invention, it is possible, without any disadvantage, to use conventional additives such as plasticisers, coloring agents, opacifiers, fillers and preserving agents (such as potassium sorbate).

In the production of the capsules according to the invention, there is added to the glycerine and/or sorbitol and water, from 1 to 90 percent of fluid silicone or a mixture of silicone fluids, which are mixed together with gelatine and added to the mixture. The operation is carried out in a conventional mixer which can be heated, for example a mixer of stainless steel or similar material, and under vacuum. The whole mixture is heated until the mass is totally melted. To this mass there may be added colouring agents, or plasticisers or other additives. From this mixture, capsules are then made by any method known per se, and these may be stored. They have very good characteristics of resistance to enzymes, mechanical strength and resistance to moisture, and they may be stored for very long periods without any sign of degradation or decomposition.

The capsules thus prepared may, immediately after their manufacture or after any period of storage, be treated with a solution of aldehyde, preferably formaldehyde, in dispersion in a highly volatile water-miscible solvent, preferably acetone. This treatment may be carried out by immersion or by spraying, but preferably by sprinkling the capsules.

In practice, especially when the sprinkling method is adopted, use is advantageously made of a dispersion (in the case of treatment of a surface area of 1,000 sq. cm. of capsules) comprising about 266 mg. of solution of formaldehyde at 30 percent strength, corresponding to 79.8 mg. of formaldehyde. The ratio of 30 percent formaldehyde to acetone is 1:60.

The formaldehyde content of the solution is checked at the beginning of the operation and from time to time during the course of operation. For this check, use is made of the BOUGAULT and GROS method (oxidation with iodine and titration on return of the excess iodine).

It should however be specified that, depending on the process selected for applying the aldehyde and according to the period of contact of this latter with the capsules, and depending on the degree of gastro-resistance and the required time of opening in the intestinal juices, use may be made of other concentrations of the formaldehyde dispersion.

The application of formaldehyde to the capsules can be effected in any appropriate manner, but, in order to avoid washing the treated capsules and their subsequent drying, and thus to ensure an optimum rapid action, this application is effected in the following manner:

In a turbine used for making pills, there are provided on the internal face of this turbine, driving, guiding and acceleration devices for the rotation of the capsules by means of strips arranged in staggered relation, and the capsules thus driven are sprinkled by the admission of the treatment solution by means of nozzles or sprinkling roses opening into the chamber of the turbine.

This process ensures a complete wetting of the capsules by the dispersion of formaldehyde, and the acetone evaporates so rapidly, the vapours being evacuated by a suction device, that it is possible to pack the capsules immediately after treatment without any drying by hot air, for example, being necessary.

One example of capsule-making according to the invention is set out below by way of example.

EXAMPLE 22.020 kg. of glycerine and 34.130 kg. of water are mixed with 10 kg. of dimethyl-polysiloxane or methyl-phenyl-polysiloxane (of 1,000 intrinsic viscosity) and 43.850 kg. of gelatine are added. This mixture is melted under vacuum in a tank of stainless steel, with agitation, at a temperature between 75° and 80° C. until the melting is absolutely complete.

The opaque mass thus obtained is then used for making the capsules in the usual manner. These capsules are resistant to enzymes and have an improved mechanical strength and resistance to moisture. Their period of storage without any degradation is practically unlimited.

Capsules of this kind can be employed for the preparation of gastro-resistant capsules by proceeding in the following manner:

15,000 capsules are introduced into a turbine used for making pills of large size, the inner face of which is lined with guiding and accelerating strips for rotating the capsules and by means of a tube communicating with a tank of a formaldehyde-dispersion in acetone in the ratio of 1:60 (formaldehyde at 30 percent strength in acetone); these capsules are sprinkled by using 755 grams of this dispersion.

The formaldehyde is immediately and integrally fixed by the gelatine while the acetone is instantaneously evacuated by a suction device provided on the said turbine.

The capsules thus treated can be immediately packed, and the whole operation of treatment, including packing, requires about 10 minutes.

The gastro-resistance in vitro and the time of opening in the intestinal juices at 37° C. were measured, using capsules treated by the conventional method (A) and capsules treated according to the invention (B), this measurement being made as a function of the ageing of the capsules.

The results have shown that in the case of the new capsules (B) the gastro-resistance of 2 hours was reached 4 days after treatment, while in the case of the known capsules (A), this gastro-resistance was only obtained 6 weeks after the treatment, the time of opening in the intestinal juices in the case of (B) for an ageing period of 2 months to one year being practically constant at 200 seconds.

For these measurements, the method USP XVII, (pages 919 to 921) was used. This method consists in subjecting the capsules for 1 hour to the action of artificial gastric juices and then to the action of artificial intestinal juices, and in measuring the time of opening in the said artificial intestinal juices.

In the case of the known capsules (A) and for the same ageing times, this time of opening varies from 300 to 620 seconds.

I claim:

1. A composition for the manufacture of gastro-resistant gelatine capsules, consisting essentially of the combination of from 23 to 27 percent by weight of water, from 17 to 29.5 percent by weight of a compound selected from glycerine and sorbitol, from 58 to 33.5 percent by weight of gelatine, and of from 1 to 90 percent with respect to water, gelatine and said selected compound, of a silicone fluid selected from dimethyl-polysiloxanes and methyl-phenyl-polysiloxanes having an intrinsic viscosity between 100 and 12,500.

2. A composition for the manufacture of gastro-resistant gelatine gelloids consisting essentially of the combination of from 50 to 80 percent by weight of water, 0.5 percent by weight of a compound selected from gylcerine and sorbitol, from 20 to 50 percent by weight of gelatine, and of from 1 to 50 percent with respect to water, gelatine and said selected compound, of a silicone fluid selected from dimethyl-polysiloxanes and methyl-phenyl-polysiloxanes having an intrinsic viscosity between 100 and 12,500.

* * * * *

UNITED STATES PATENT OFFICE
CERTIFICATE OF CORRECTION

Patent No. 3,653,934          Dated April 4, 1972

Inventor(s)          FERNAND JACQUES ROLLE

It is certified that error appears in the above-identified patent and that said Letters Patent are hereby corrected as shown below:

In column 1, line 4, the name of the assignee should read:  R. P. Scherer Corporation Signed and sealed this 8th day of August 1972.

(SEAL)
Attest:

EDWARD M. FLETCHER, JR.          ROBERT GOTTSCHALK
Attesting Officer                Commissioner of Patents